United States Patent [19]
Gold et al.

[11] Patent Number: 5,371,942
[45] Date of Patent: Dec. 13, 1994

[54] APPARATUS FOR INSTALLING A PREFABRICATED CABLE HARNESS

[75] Inventors: Berhnard Gold, Grafenau; Ernst Kayser, Waldenbuch, both of Germany

[73] Assignee: Mercedes-Benz AG, Germany

[21] Appl. No.: 134,795

[22] Filed: Oct. 12, 1993

[30] Foreign Application Priority Data

Oct. 14, 1992 [DE] Germany ............................ 4234550

[51] Int. Cl.$^5$ .............................................. B23P 21/00
[52] U.S. Cl. ......................................... 29/783; 29/771; 29/791; 29/809
[58] Field of Search ............... 29/742, 771, 783, 784, 29/786, 791, 793, 794, 799, 809, 822, 281.1, 281.5

[56] References Cited

U.S. PATENT DOCUMENTS

| | | | |
|---|---|---|---|
| 4,222,166 | 9/1980 | Kurek et al. | 29/809 |
| 4,553,309 | 11/1985 | Hess et al. | 29/791 |
| 5,033,178 | 7/1991 | Woods | 29/281.1 |
| 5,191,707 | 3/1993 | Sasamoto et al. | 29/783 |
| 5,199,147 | 4/1993 | Whiteside | 29/281.1 |

FOREIGN PATENT DOCUMENTS

| | | |
|---|---|---|
| 0007228 | 1/1980 | European Pat. Off. . |
| 0284488 | 9/1988 | European Pat. Off. . |
| 3337596 | 8/1987 | Germany . |
| 3935628 | 5/1991 | Germany . |

*Primary Examiner*—Mark Rosenbaum
*Assistant Examiner*—David P. Bryant
*Attorney, Agent, or Firm*—Evenson, McKeown, Edwards & Lenahan

[57] ABSTRACT

The invention relates to an arrangement for installing a prefabricated cable harness in the interior of an empty vehicle body of a passenger car at the initial stage of its final assembly. A known cable harness which is suitable for handling by an automatic device is to be moved into the passenger compartment by mechanized handling. The cable harness which is arranged on a cable harness carrier that is prepared in a positionally defined manner, is received by a specially designed gripper. The gripper then guides the cable harness through the windscreen opening into the passenger compartment and sets the cable harness down in an approximate installation position. With this arrangement, the bulky and heavy cable harness can be installed reliably and rationally in the vehicle body. Possible damage to the vehicle body and to the cable harness by chafing is avoided during installation.

8 Claims, 4 Drawing Sheets

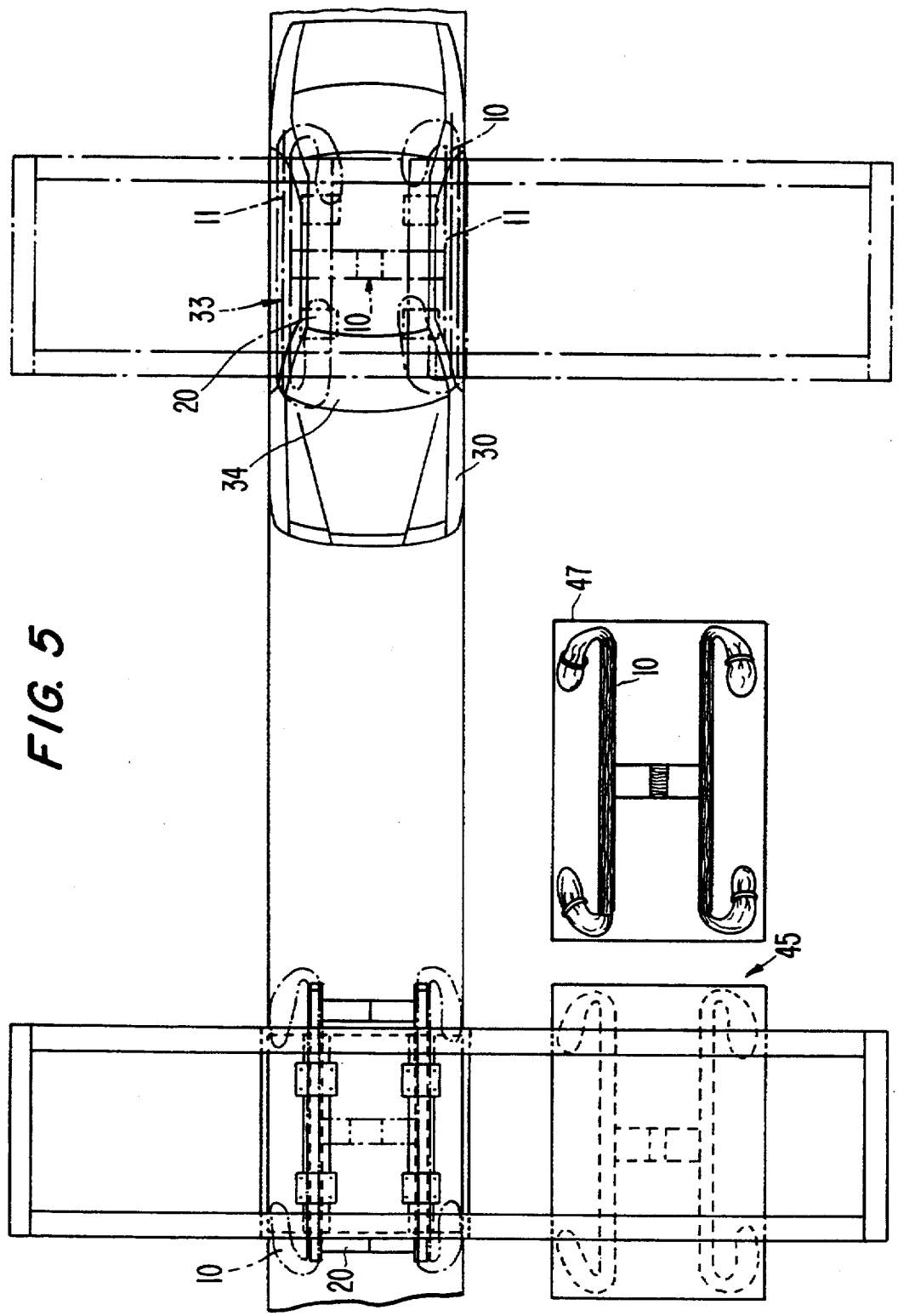

APPARATUS FOR INSTALLING A PREFABRICATED CABLE HARNESS

BACKGROUND AND SUMMARY OF THE INVENTION

The invention relates to an arrangement for installing a prefabricated cable harness in the interior of a still empty vehicle body of a passenger car at the initial stage of its final assembly. The cable harness consists of a plurality of branches, two of which, the longitudinal branches are arranged in such a way that in the installed state they come to rest on the inside of in each case one sill beam. At least one further branch, i.e., a transverse branch is arranged in such a way that in the installed state it runs on the inside transversely across the floor of the passenger compartment so that the cable harness has an H-shaped or ladder-shaped structure which extends over the entire inner width of the passenger cell. Each branch consists of a multiplicity of conductors which run in an enclosure which is flexible to a limited degree, is shaped in a defined fashion and matched to the shape of the vehicle body along the laying path. The conductors at the junction points of the different branches pass through an adjacent enclosure without interruption and in different courses. Cable conductors or flexible bundles with few conductors, which combined form in each case one flexible bundle which are to be laid individually in each case and are to be connected to electrical loads, emerge at least at both ends of the enclosures of the two longitudinal branches.

This type of arrangement is known from, for example, German Patent Document DE-PS 33 37 596. In the German Patent Document DE-PS 33 37 596, it is proposed, for the purpose of the mechanized installation of electrical lines combined to form a cable harness, to stiffen the cable harness in such a manner that it has the necessary dimensional rigidity for the use of automatic handling devices. As a result, although the problem of handling the cable harness by an automatic device is solved, the necessary design of an automatic device for installing a bulky cable harness in the interior of a vehicle body through the vehicle body openings which permit only limited displacement paths and components of only a limited size is, however, not indicated.

There is therefore needed an arrangement for the mechanized installation of the cable harness of the generic type in the passenger cell.

This need is met according to the present invention with an arrangement for installing a prefabricated cable harness in the interior of a still empty vehicle body of a passenger car at the initial stage of its final assembly. The arrangement includes a program-controllable, flat gripper which can be moved independently in all three spatial directions and is adapted to the cable harness. The displacement space of the gripper extends between a positionally defined location at which the cable harness is prepared and the location at which the vehicle body is prepared. In the gripper, two parallel gripper arms project freely from the gripper holder in the longitudinal direction of the vehicle so that the gripper arms can be inserted into the interior of the vehicle through the windscreen opening or rear window opening and can be lowered to the level of the floor of the passenger compartment.

The bundles are enclosed or bound provisionally with reversible material and turned back parallel to the longitudinal branches. In addition, the arrangement has a scissor-type elevating platform for preparing in each case a cable harness which is held on a cable harness carrier as a transport vessel, in a desired shape, at least approximate to the later installation position of the cable harness. For receiving the longitudinal branches and the cable termination bundles of the cable harness, the cable harness carrier has upwardly open rows of forks and a number of cross-struts corresponding to the number of transverse branches for receiving the transverse branches. The transverse branches have in their enclosure one articulation point on each side of the center for bending the transverse branches and for pivoting the two longitudinal branches towards the center in order to reduce the width requirement of the cable harness. The cable termination bundles which are folded back in the cable harness carrier lie at least approximately coaxially with respect to the articulation points of the transverse branches.

In each case, a plurality of prongs for engaging under the longitudinal branches and the cable termination bundles are arranged on the two gripper arms. The engagement takes place by pivoting the gripper arms about a longitudinal axis out of their position of rest into their working position and the setting down of the cable harness is achievable by a reverse pivoting movement.

The advantages of the mechanized installation of the cable harness in the vehicle body are that the heavy and bulky cable harness can be installed reliably and more rationally in the vehicle body. In comparison with manual installation of the cable harness, a savings of a large number of personnel is made since the manual installation requires for a short time a large number of people who are, however, not utilized continuously. In addition, the risk of injury to the hands and fingers of the persons required for the manual installation as a result of sharp edges on sheet metal flanges of the vehicle body is large.

Furthermore, with mechanized installation, damage to the vehicle body or to the cable harness resulting from mutual chafing is avoided. Since with mechanized installation the weight of the cable harness no longer plays a decisive role, the cable harness can be of single-component design as a result of which it becomes more economical and less prone to faults since plug-in connections between branches of the cable harness, which connections are susceptible to moisture and oxidation, are avoided. By providing the cable harness on the cable harness carrier, preparatory work at the assembly line before the installation of the cable harness in the vehicle body is also dispensed with.

Other objects, advantages and novel features of the present invention will become apparent from the following detailed description of the invention when considered in conjunction with the accompanying drawings.

BRIEF DESCRIPTION OF THE DRAWINGS

FIG. 5 is a top plan view of the assembly arrangement with the gripper, the feeding in of the cable harness carrier and the body of the vehicle.

DETAILED DESCRIPTION OF THE DRAWINGS

Figure 1:
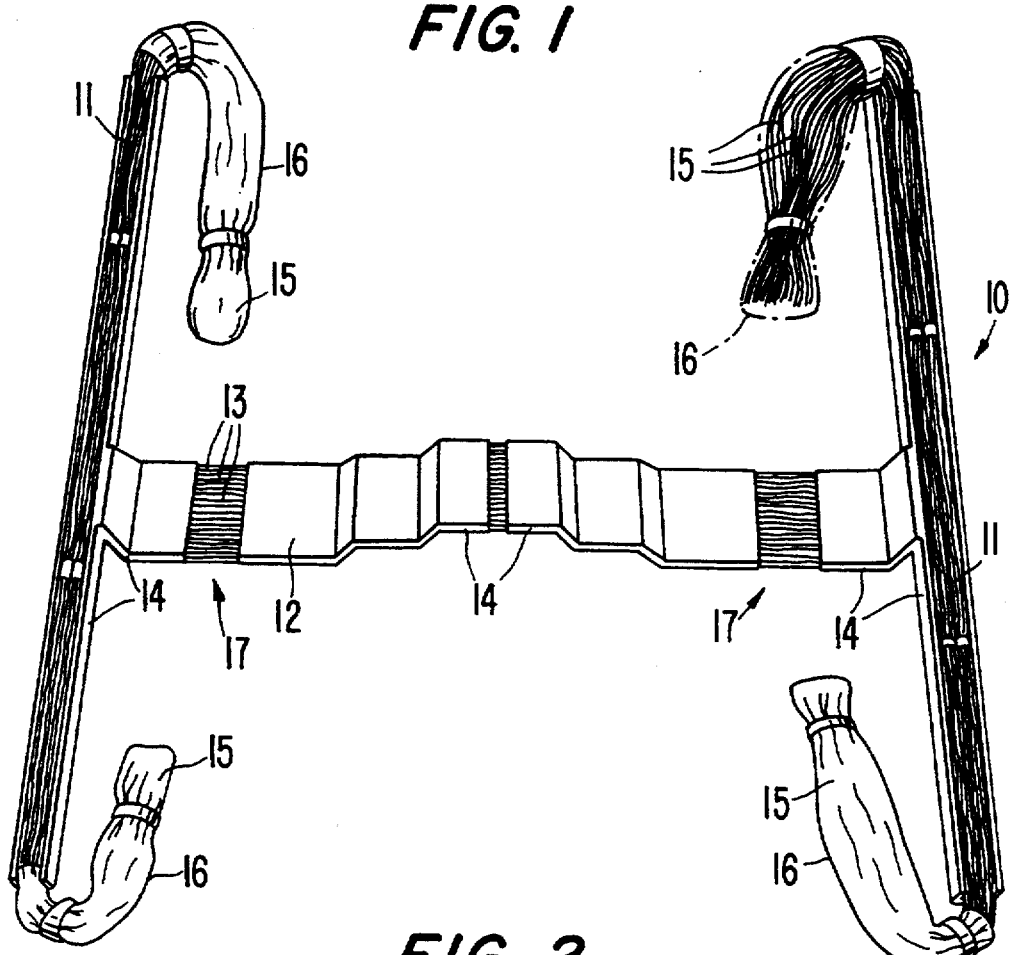
FIG. 1 is schematic illustration of a cable harness.

In FIG. 1, a cable harness 10 is illustrated. It consists of two longitudinal branches 11 and a transverse branch 12. The longitudinal branches 11 are arranged in such a manner that in the installed state they come to rest on the inside of in each case one sill beam. The transverse branch 12 is arranged in such a manner that in the installed state it runs on the inside transversely across the floor of the passenger compartment. Overall, the cable harness 10 has an H-shaped structure which extends over the entire inner width of the passenger cell 33 (FIG. 5). Each branch 11, 12 consists of a multiplicity of conductors 13 which run in an enclosure 14 which is flexible to a limited degree, is shaped in a defined fashion and matched to the shape of the vehicle body along the laying path. The conductors 13 pass through the junction points of the different branches 11, 12 without interruption and run in different courses of an adjacent enclosure 14. Cable conductors 13, which are to be laid in each case individually and to be connected to electrical loads, or flexible bundles with few conductors 13 emerge at the ends of the enclosures 14 of both longitudinal branches 11. When combined, the conductors 13 form in each case a flexible cable termination bundle 15. The enclosure 14 of the transverse branch 12 has an articulation point 17 on each side of the center for bending the transverse branch 12.

Figure 2:
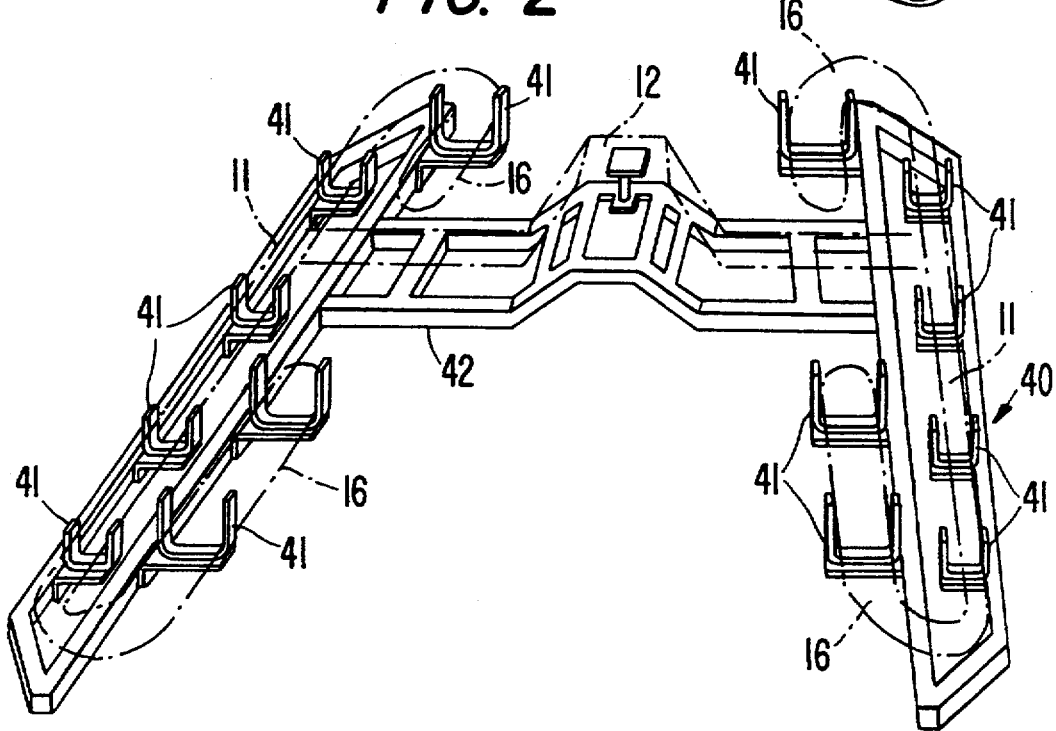
FIG. 2 is schematic illustration showing the arrangement of the cable harness in the cable harness carrier.

FIG. 2 shows the arrangement of the cable harness 10 (dash-dotted lines) in FIG. 1 in the cable harness carrier 40. The cable harness carrier 40 has upwardly open forks 41, arranged in two rows, for receiving the longitudinal branches 11 and the cable termination bundles 15 of the cable harness 10. The bundles are provisionally enclosed with reversible material 16, and are folded back parallel to the longitudinal branches 11. The transverse branch 12 is held by a cross-strut 42. The cable termination bundles 15 which are folded back in the cable harness carrier 40 lie here approximately coaxially with respect to the articulation points 17 of the transverse branch 12. Thus, the cable harness 10, with the exception of the cable termination bundles, is held in the cable harness carrier 40 in a position corresponding to the installation position. This is done so that the transverse branch 12 lies flat on the cross-strut 42.

Figure 3:
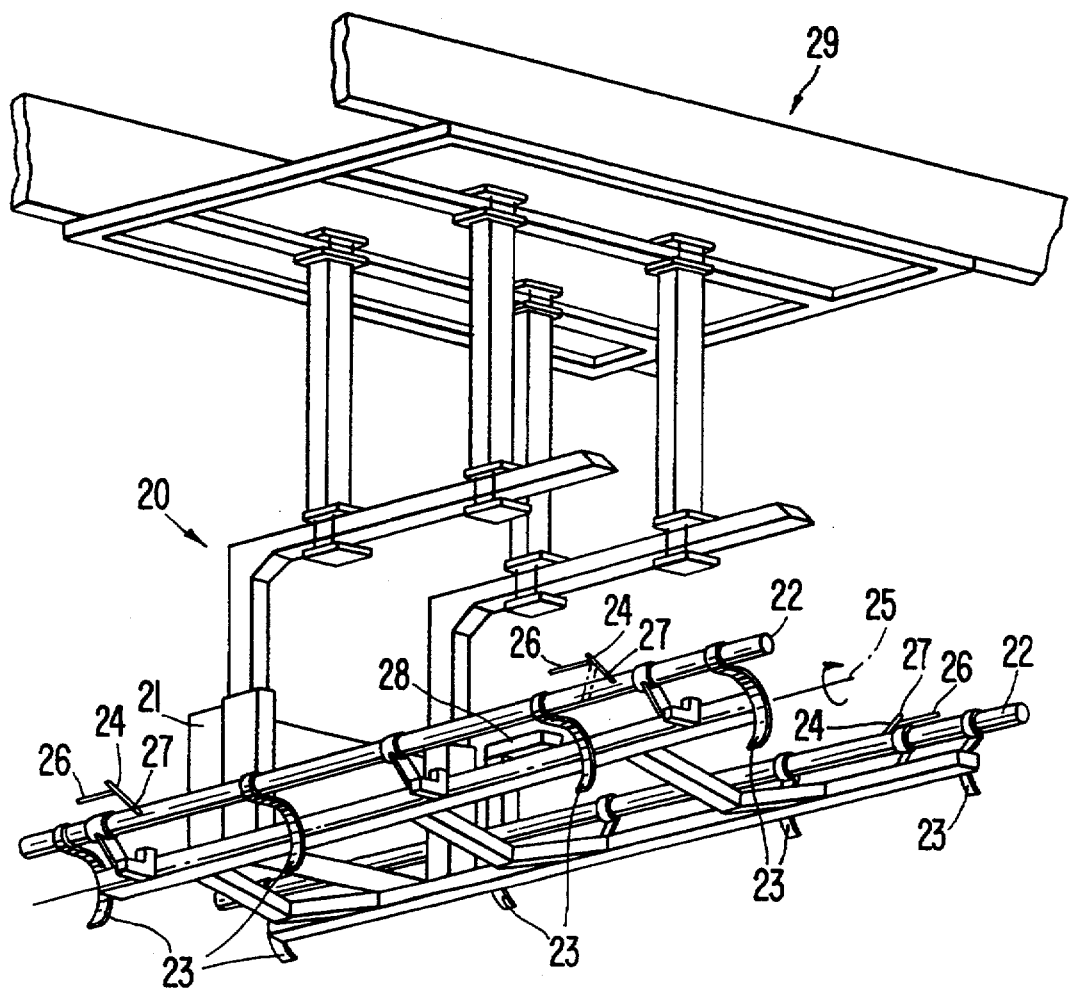
FIG. 3 is a perspective view of the gripper according to the present invention.

FIG. 3 shows a perspective view of the gripper 20 and its guide 29. The guide 29 of the gripper, which guide is of cartesian design, is arranged with the horizontal guiding elements arranged overhead, whilst the vertical guiding elements are integrated into the holder 21. The horizontal guiding elements include transverse member 35, which is mounted for sliding movement along guide 29. The displacement space of the gripper 20 extends between the positionally defined location at which the cable harness 10 is prepared and the location at which the vehicle body 30 is prepared. The gripper component and the gripper arms 22, which receive the cable harness, project freely from the gripper holder 21 in the longitudinal direction of the vehicle. As a result, the gripper 20 can be inserted, coming from the front, through a windscreen opening 34 (FIG. 5) into the interior of the vehicle. Holding forks 28, for receiving the transverse branch 12, which engage below the transverse branches 12 are arranged approximately in the center between the gripper arms 22. Bundle prongs 23 serve to receive the folded-back cable termination bundles 15 and protrude, in their rest position, away from the gripper arms 22 in the direction of the respectively opposite gripper arm 22 and are bent down at their free end in an arcuate shape through an approximate quarter circle. The pivot axis 25 of the gripper arms 22 is arranged concentrically with respect to the quarter circle arc. Branch prongs 24 serve to receive the longitudinal branches 11. The prongs 24 are arranged approximately diametrically opposite the bundle prongs 23 on the gripper arm 22 and are constructed in each case as a pair of legs arranged in each case in a L-shape. In the position of rest of the gripper arm 22, there is one, approximately horizontally lying movable leg 26 of the branch prong 24 in a folded back position running in the longitudinal direction. In order to receive the longitudinal branch 11, it is pivoted outwards.

Figure 4A:
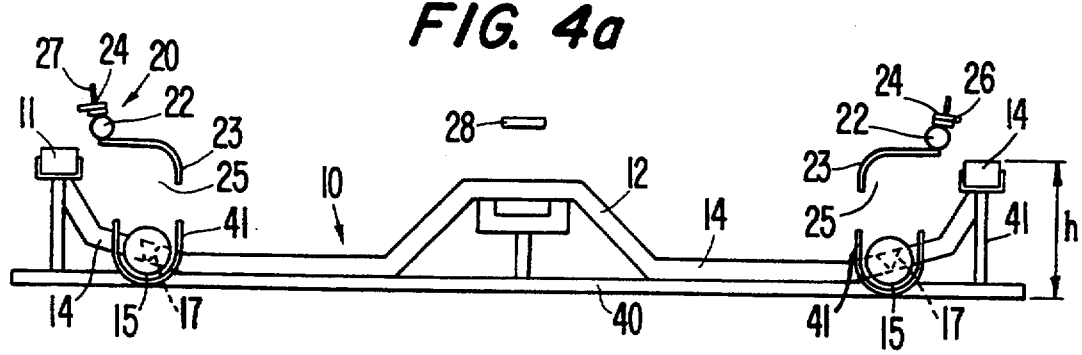
FIGS. 4a–d are diagrammatic views of the removal of the cable harness from the cable harness carrier using the gripper.

The other leg 27 which is attached fixedly to the gripper arm 22 projects upwards in the position of rest of the gripper arm 22 (FIG. 4a). In this position, the distance between the gripper arms 22 in the position of rest is such that in the central position of the gripper 20 with respect to the cable harness carrier 40, the gripper arms 22 are located between the longitudinal branches 11 and the articulation points 17 of the transverse branch 12 or the folded-back cable termination bundles 15 of the cable harness 10.

Figure 4B:
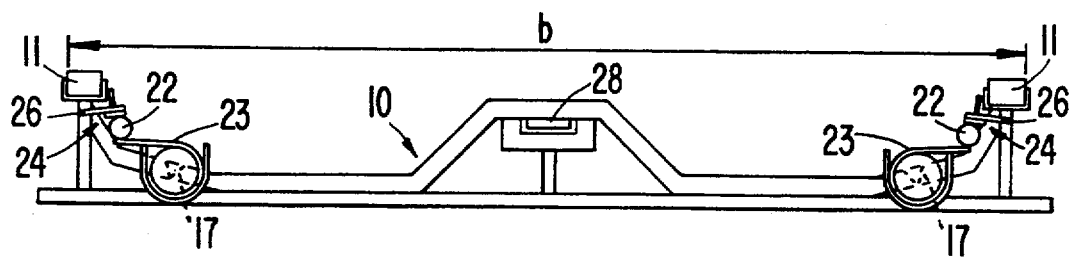
Figure 4C:
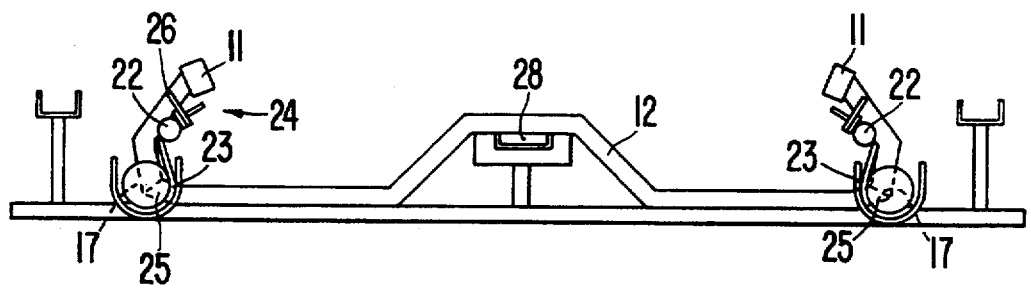
Figure 4D:
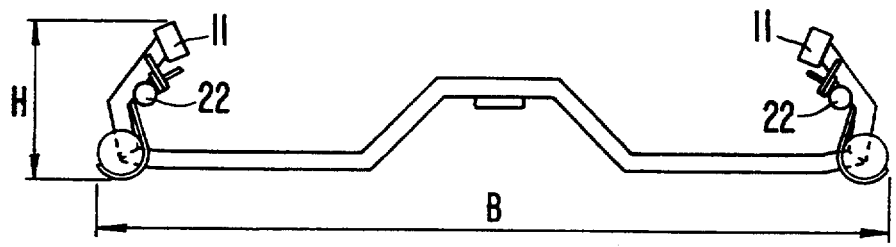
Figure 4D:
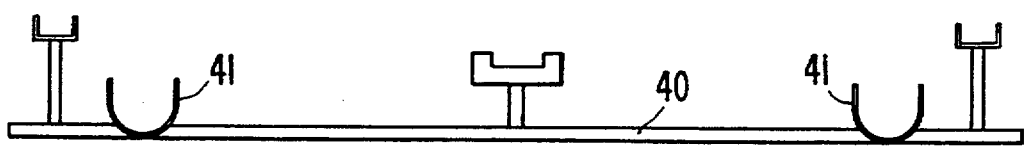

FIGS. 4a–d show a diagrammatic view of the removal of the cable harness 10 from the cable harness carrier 40 by the gripper 20. In FIG. 4a, the gripper 20 which is located in the position of rest and has been moved into the position in which it is central with respect to the cable harness carrier 40 is illustrated. The gripper 20 is lowered so that the position illustrated in FIG. 4b is reached. The branch prongs 24 then lie below the longitudinal branches 11, the movable legs 26 being pivoted outwards. The bundle prongs 23 are still above the folded-back cable termination bundles 15. In this arrangement, the free ends of the bundle prongs 23 project out inwards over the cable termination bundles 15. By displacing the movable holding fork 28 of the gripper 20 in the longitudinal direction, the said gripper 20 moves under the transverse branch 12. Subsequently, the gripper arms 22 are pivoted about their respective pivot axis 25. As a result, the working position shown in FIG. 4c is reached. The transverse branch 12 of the cable harness is bent upwards at the articulation point 17. The cable termination bundles 15 rest on the bundle prongs 23 which engage below them and continue to be located as an extension of the articulation points 17. It is possible to arrange additional fixed prongs on the gripper, which prongs hold down the longitudinal branches 11 after the lowering of the gripper 20 onto the cable harness 10 and which, after the pivoting of the gripper arms 22 in conjunction with the bundle prongs 23, form a holder which engages around the longitudinal branches. Branch prongs 24 engage below the upwardly and inwardly pivoted longitudinal branches 11 thus holding them securely. At the same time, the two legs 26, 27 of the branch prongs are loaded by the longitudinal branches' 11 own weight. In addition, the transport width b and transport height h of the cable harness determined by the position in the cable harness carrier 40 are transferred, due to the pivoting movement, to the insertion width B which is suitable for movement into the passenger cell 33 through the windscreen opening 34. The insertion width B is slightly smaller than the transport width, and the insertion height It is somewhat increased. FIG. 4d shows the removal of the cable harness 10 from the cable harness carrier 40 which takes place by simply moving the gripper 20 upwards. The sitting down of the cable harness 10 in the passenger cell is then effected by the reverse pivoting movement of the gripper arms 10.

FIG. 5 shows a top plan view of the assembly arrangement tier inserting a cable harness 10 into the vehicle body 30. A transport stand 45 can be transported from the place of manufacture of the cable harnesses 10 to the place of assembly and set down in a positionally defined fashion at the place of assembly next to the movement path of the vehicle bodies 30. A plurality of cable harness carriers 40 (FIG. 2) are arranged one on top of the other in separate guides in the transport stand 45. Each of the cable harness carriers 40 can be pulled out from the transport stand 45 and inserted again individually in the manner of a drawer. With the cable harness carrier 40 pulled out completely, the cable harness 10 lies completely exposed in order to be received by the gripper 20. The scissor-type elevating platform 47 serves as support for the pulled-out cable harness carrier 40. Instead of a scissor-type elevating platform, any other elevating platform arrangement which is vertically adjustable in a controlled fashion can be used. On the elevating platform there are guides which define the position of the cable harness carrier 40 on the scissor-type elevating platform 47. The scissor-type elevating platform 47 is provided with a servo drive which adjusts the height of the platform between the insertion height and pulling out height of the cable harness carrier 40 from the transport stand 45 and the transfer height for the transfer of the cable harness 10 by the gripper 20.

The cable harness 10 is removed from the cable harness carrier 40 by the gripper 20 in the manner described in FIG. 4. In the meantime, a vehicle body 30 which is to be equipped is prepared. The gripper 20 is moved in the vertical direction to the height of the windscreen opening 34 and then into a position above the engine compartment of the vehicle body 30. The gripper 20 is then moved in the longitudinal direction of the vehicle and introduced into the passenger cell 33. In the process, the vertical guide of the gripper 20 moves into a position just in front of the upper edge of the frame of the windscreen. The gripper arms 22 are then lowered to a height just above the floor of the passenger compartment. Subsequently, the gripper arms 22, which are arranged in a longitudinally movable fashion on the gripper, are moved in the direction of the engine compartment in order to introduce the parts of the cable harness 10 which project into the foot well into this area. The cable harness 10 is set down by the outward pivoting of the longitudinal branches 11 out of the gripper arms 22 that the cable harness 10 comes to rest in the installation position. The cable harness 10 is shown in its installed position in the passenger compartment by the dash-dot lines in FIG. 5

Subsequently, the longitudinal branches 11 are pivoted back and the gripper 20 is moved out of the passenger cell 33 by reverse movement. In this time, the empty cable harness carrier 40 is pushed back to its original place in the transport stand 45, the next cable harness carrier 40 is pulled from the transport stand 45 onto the scissor-type elevating platform 47 and the scissor-type elevating platform 47 is moved back to transfer height. Changes of the transport stand which may be necessary can also be carried out. The control of the movement path of the gripper 20 can take place either by means of a numerical control with sensors for determining the position of the gripper 20 and of the vehicle or by a machine guide by means of a direct actuation, for example, remote steering.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for installing a prefabricated cable harness in an interior of a vehicle body of a passenger car at an initial stage of the car's final assembly, said cable harness including a plurality of branches, two of said branches being longitudinal branches arranged such that in an installed state each longitudinal branch rests on an inside of a respective sill beam, and at least one further branch being a transverse branch arranged such that in the installed state it runs transversely across a floor of a passenger compartment of the passenger car, whereby the cable harness extends over an entire inner width of the compartment, said branches together forming an enclosure having a multiplicity of conductors which run therein, said enclosure having a limited degree of flexibility said multiplicity of conductors passing through said enclosure at junction points of said branches without interruption and with varying courses; said longitudinal branches having, emerging at both ends of each of said longitudinal branches, at least one flexible bundle that is to be laid for connection to electrical loads, the apparatus comprising:

- a program-controllable flat gripper which can be moved independently in all three spatial directions and is adapted to grip and move said cable harness, a displacement space of said gripper extending between a location at which the cable harness is stored and a location at which the cable harness is inserted into the vehicle body
- a holder having two parallel arms projecting freely therefrom in a longitudinal direction of the vehicle body so that said holder arms can be inserted into the interior of the vehicle body through one of a windscreen opening and a rear window opening and thereafter can be lowered to a floor level of the passenger compartment;
- a scissor-type elevating platform upon which the cable harness can be positioned at said cable harness storage location;
- a cable harness carrier for holding said cable harness in a desired orientation;
- wherein the cable harness carrier has upwardly open rows of forks for receiving the longitudinal branches and the flexible bundles of the cable harness, said flexible bundles being provisionally enclosed within reversible material and turned back parallel to the longitudinal branches; said cable harness carrier further having a number of cross-struts equivalent to the number of transverse branches, each transverse branch having one articulation point arranged on each side of a center of said transverse branch to permit bending of said transverse branch and pivoting of the two longitudinal branches towards said center in order to reduce a width requirement of the cable harness, the flexible bundles when in the cable harness carrier lying approximately coaxially with respect to the articulation points of each transverse branch;

a plurality of prongs, for engaging under the longitudinal branches and the flexible bundles, arranged on the two holder arms, the engagement taking place by pivoting the holder arms about a longitudinal axis out of a rest position wherein said prongs do not engage said longitudinal branches into a working position wherein said prongs engage said longitudinal branches, and a disengagement of the cable harness being achievable by a reverse pivoting movement.

2. An apparatus according to claim 1, wherein a plurality of cable harness carriers are arranged one on top of the other in separate guides in a transport stand which can be located in a predetermined position at said storage location, each cable harness carrier being capable of being pulled out individually from the transport stand and being inserted again in the manner of a drawer, such that, when a cable harness carrier is completely pulled out from the transport stand, its respective cable harness is accessibly exposed and can be placed upon said elevating platform in order to be received by the gripper.

3. An apparatus according to claim 2, wherein the scissor-type elevating platform serves as a support for a pulled-out cable harness carrier, said scissor-type elevating platform having guides for receiving a cable harness carrier and being provided with a program-controllable servo drive with which the level of said scissor-type elevating platform can be moved between a transfer level in which a cable harness is taken out of the cable harness carrier by the gripper and various levels for inserting the cable harness carrier into the transport stand.

4. An apparatus according to claim 1, wherein the cable harness is held in the cable harness carrier in the orientation in which it is to be inserted within said passenger compartment.

5. An apparatus according to claim 4, wherein said holder arms include a plurality of bundle prongs arranged thereon for receiving said turned-back bundles of said cable harness, said bundle prongs each including free ends which are bent in an arcuate shape through approximately a quarter circle, and wherein said bundle prongs project downwards in the rest position of the holder arms;

wherein a pivot axis of the holder arms is arranged approximately concentrically with respect to the axis of the quarter circle arcs of the bundle prongs;

wherein said plurality of prongs for engaging the longitudinal branches are arranged approximately diametrically opposite the bundle prongs on the holder arms and each has a pair of legs forming an L-shaped construction, one approximately horizontally lying leg of said plurality of prongs being movable in the rest position of its respective holder arm towards and away from said holder arm and the other of said pair of legs projecting upwards in the rest position of said respective holder arm; and wherein the distance between the holder arms is such that, in the rest position, when the gripper is in a central position with respect to the cable harness carrier and the cable harness held thereon, the holder arms are located between the longitudinal branches and the articulation points of the at least one transverse branch are between the turned-back flexible bundles of the cable harness.

6. An apparatus according to claim 1, wherein said gripper includes a plurality of holding forks arranged thereon for engaging the underside of the at least one transverse branch, said holding forks being arranged approximately centrally between the holder arms.

7. An apparatus according to claim 1, wherein a gripper guide is connected with said gripper and is constructed as a cartesian guide.

8. An apparatus according to claim 7, wherein the gripper guide has horizontally movable guide elements arranged overhead the gripper.

* * * * *